Inventor
Floyd L. Gray
By Ralph G. Hohenfeldt
Attorney

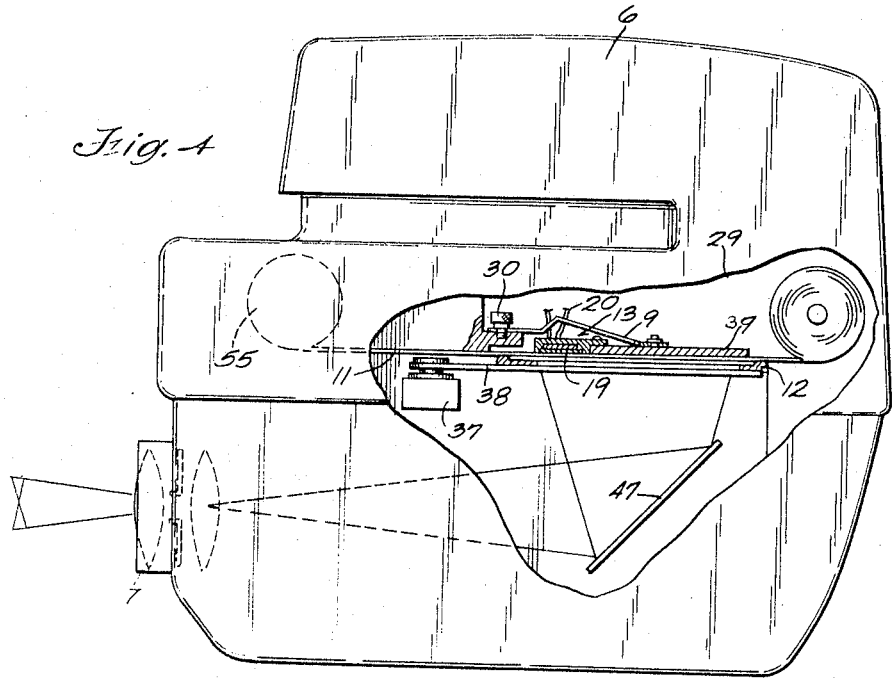
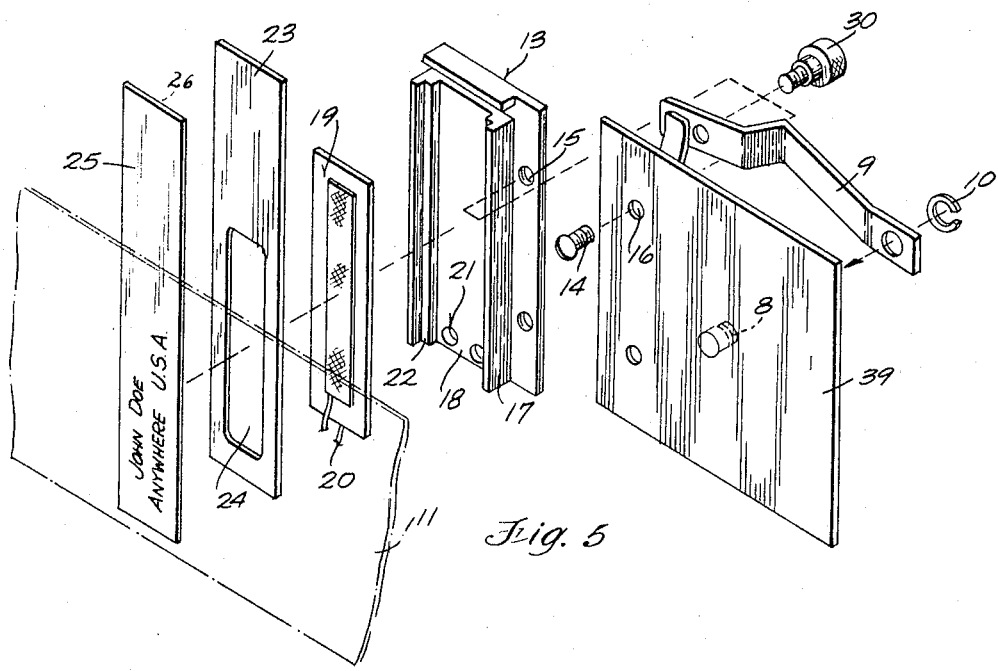

United States Patent Office 3,452,196
Patented June 24, 1969

3,452,196
FILM IDENTIFICATION DEVICE HAVING AN ELECTROLUMINESCENT PANEL BUILT INTO A CAMERA
Floyd L. Gray, Hales Corners, Wis., assignor to General Electric Company, a corporation of New York
Filed Sept. 28, 1967, Ser. No. 671,352
Int. Cl. G01n 23/04
U.S. Cl. 250—67    5 Claims

ABSTRACT OF THE DISCLOSURE

A camera is adapted to photograph the optical image of a converted X-ray image. A translucent strip with patient identification data written on it is inserted between the back of the film and an electroluminescent panel which is built into the camera. The panel is controlled to emit consecutive light pulses which print the data in an area between film frames.

Background of the invention

This invention relates to a device for recording extra data on consecutive film frames in any camera and is illustrated in connection with photographing images appearing on luminescent screens of X-ray image intensifiers and fluoroscopic devices.

Radiologists often examine a patient visually with an X-ray image intensifier and then photographically record selected images of diagnostic interest. For this purpose, the image intensifier is optically coupled with a roll-film camera that permits taking successive photographs of an individual patient or a series of patents. It is necessary to relate the record scene to the name and other data pertaining to the patient when the roll-film is developed and cut-up.

Heretofore, identification data has been inscribed on photographic and radiographic films by applying the data to an index card and reflecting or transmitting light from it through a special optical system or through the camera to the film. The data is thereby recorded on a zone of the film that does not overlap the recorded scene. Some of the known data recording devices use a separate incandescent lamp outside of the camera, for illuminating the data card, and a mirror and lens system for directing the data to the film. Other devices illuminate the index card with light from the X-ray fluorescent screen which is being photographed. Among the disadvantages of such systems are that heat from the lamp must be dissipated, focusing of the data images is not always sharp, it is difficult to obtain correct exposure of the data on the film, light diffuses from the data zone to the recorded scene, synchronizing errors occur between data exposure and film transport, and it is difficult to fit all of the parts in a small allowable space. It is also difficult to obtain a short duration light pulse of sufficient energy. Transfer lens systems are limited in efficiency to about ten percent and require high light intensities for operation. In addition, since the data bearing cards and the optical system are separate from the camera, the luminescent screen, optical system and camera combination require design individualization.

Summary of the invention

The present invention overcomes the above-noted problems. It involves typing or otherwise writing data on a thin translucent card which, in a preferred embodiment, has pressure sensitive adhesive on one side. The card is applied to a thin metal masking strip having an aperture or window in alignment with the data. The strip and card are inserted jointly through a light-tight slot in the camera wall between the printed data and the back of the photographic film to make intimate contact with the film under the influence of the camera's film pressure plate. An electroluminescent panel is mounted in a holder on the pressure plate. The panel bears on the strip and the strip bears on the film so that when the panel is caused to emit a pulse of light, the data is printed sharply on the film. In one embodiment, the panel is energized or pulsed through a step-up transformer with energy derived from a capacitor. The capacitor discharge time is subject to control so that the data is properly exposed for a wide range of film speeds and film gamma. The light pulse is intense and its rise and decay time is so rapid that there is no blurring of the printed data even if the data exposure is made in the initial instant of film transport.

As implied in the foregoing discussion, a general object of this invention is to provide an improved device for recording patient identification and other extra data on X-ray diagnostic and other photographic film. Other objects are to provide a data printing device that can be built into practically any camera, that uses a relatively cold and controllable electroluminescent light source which is in direct contact with the data bearing card so as to eliminate penumbra around the printing, that avoids lenses and incidental light loss and diffusion, and that records data at proper film density even when the film is beginning to move.

Achievement of the foregoing and other more specific objects will be evident from time-to-time throughout the course of the ensuing description of the invention which is made in reference to the accompanying drawings.

Description of the drawings

FIGURE 4 is a side view of a camera, with its wall broken away to show the film identification device in vertical cross-section; and, FIGURE 5 is an exploded view of certain parts of the film identification device which are isolated from the camera and exclude the controlling electric circuitry.

Description of the preferred embodiment

Figure 1:
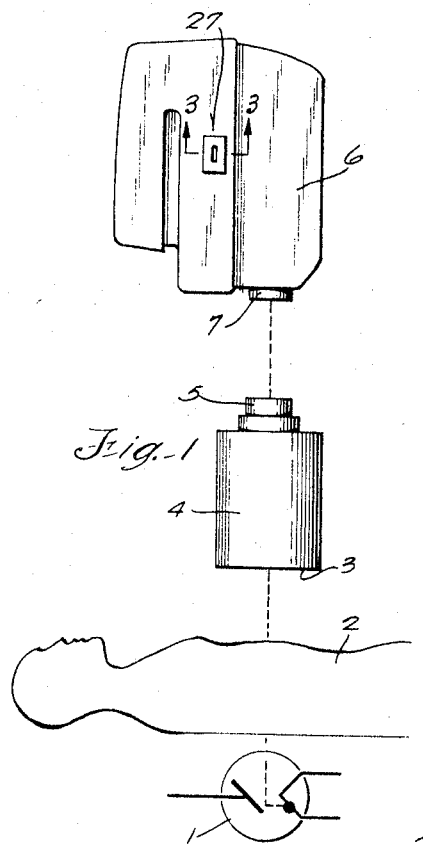
FIGURE 1 is a diagram of a system for photographically recording optical images that are converted from X-ray images, the new film identification device being installed in the camera thereof.

In FIGURE 1, an X-ray tube 1 is adapted to project a beam of rays through a subject 2 to form an X-ray shadow image on the lower or input end 3 of an X-ray image intensifier tube 4. The intensifier tube may be a well-known type that consecutively converts images from X-ray, to light, to accelerated electrons, and finally, to a high brightness light image. The light image may be directly viewed through a periscopic mirror and lens system, not shown, or the light image may be photographed from the exit end 5 of tube 4. A camera 6 is positioned for photographing X-ray scenes of interest to the radiologist. The lens 7 of the camera is on the optical axis of intensifier 4 and it is aimed toward the output end 5 of the intensifier. In practice, there is a light-tight coupling between the camera and image intensifier or both of these devices and other devices associated with image intensifier systems may be installed in a single light-tight housing, not shown.

The controls for the X-ray tube are not shown, but they include, as usual, means for controlling X-ray tube current, voltage and conduction interval. The electrical circuitry and controls associated with the image intensifier tube are also omitted. The X-ray tube, camera and image intensifier tube controls may be interconnected for interaction as described in a copending application for an "X-Ray Image Amplifier System With Automatic Exposure Control," in the name of Harold J. Dalman, filed Sept. 22, 1965, Ser. No. 489,285, assigned to the assignee of the instant invention.

For the present purposes, it is sufficient to know that the image intensifier tube 4 may be turned on coincidentally or in any time relationship with the X-ray tube 1 and that the intensifier tube may be blanked instantaneously at the desired terminal point of an exposure. Thus, image intensifier tube 4 is adapted to act as a shutter having fast image turn-on and turn-off. As a result, the conventional mechanical shutter in the camera can be opened and closed at a more leisurely pace before and after the X-ray exposure and at the beginning and end of a film advancing cycle.

The details of the new film data printing assembly which is installed in the camera will first be described in reference to FIGURES 4 and 5. The film pressure plate of the camera is given the reference numeral 39. The plate has a central stud 8 on its backside by which it may be attached to a pressure plate spring 9 by means of a snap ring 10. Spring 9 is anchored by a screw 30 in the camera and the spring causes plate 39 to exert pressure on a region of film 11 which is in exposure position and lays between an apertured backing plate 12 and plate 39 as can be seen best in FIGURE 4.

In FIGURE 5, one may see that a nonmetal holder 13 is adapted to be fastened to pressure plate 39 by means of flat head screws 14 which pass through counterbored holes 16 in the backing plate and are secured in threaded holes 15 of the holder 13.

Holder 13 has a channel-shaped cross-section defined by off-set sidewalls 17. The bottom 18 of the channel accommodates an electroluminescent lamp panel which is generally designated by reference numeral 19. Electrical leads 20 from panel 19 pass through holes 21 in the back of holder 13.

The holder walls 17 have shoulders 22 that are spaced apart an appropriate distance to act as tracks for a thin spring metal strip 23 which serves as a data card mounting device. Strip 23 has opaque margins defining an open window 24 through which light from the electroluminescent panel 19 may pass when the panel is energized. Strip 23 is insertable and removable from holder 13, which remains in the camera, through a light-tight seal in the camera wall. The light-seal will be described in detail later in connection with FIGURE 3.

The extra data to be printed on film 11 may be typed or otherwise inscribed on a translucent tab or flexible index card 25. The inscription, of course, is made with ink or other light opaque writing medium. Card 23 is preferably made of thin plastic material which has a pressure sensitive adhesive on its backside 26. These cards are obtainable as tear-off strips which are mounted on a backing sheet, not shown, but a size that is convenient to place in a typewriter. A technician may type a whole series of cards 25 before the radiologist begins examining the patients, so that the cards will be ready for insertion when they are called for.

The adhesive backed cards 25 are pressed onto metal strip 23 when it is removed from the camera so that the printing on the cards is in alignment with the open aperture or window 24 in the strip. The card 25 adheres to the opaque margin surrounding the window 24 in strip 23. On demand, strip 23 is inserted through the wall of the camera along the guide shoulders 22 of holder 13. Then, in a sequence of operations which will be described later, the electroluminescent panel 19 is energized periodically to print the data on the film frames.

Figure 3:
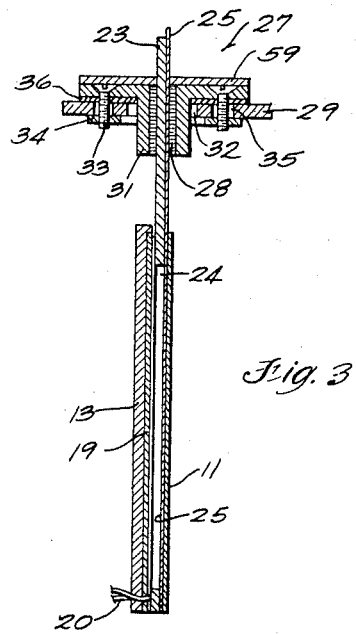
FIGURE 3 is a partial cross-sectional view taken through the light seal on a line corresponding with 3—3 on the camera shown in FIGURE 1.

FIGURE 3 shows a cross-section of the light-seal 27 through which the windowed metal strip 23 and the adhesive data card 25 which is carried are jointly inserted into the camera between electroluminescent panel 19 and film 11. The light-seal 27 comprises two angle members 31 which extend through an opening 32 in camera housing 29. Screws 33 pass through clearance holes 35 in the housing and thread into a tapped nut plate 34 on the inside of the camera. A pliable gasket 36 is interposed between the bottom of the flanges of angles 31 and the outside of camera wall 29. Velure strips 28 are secured on each side of the slot through which the metal strips 23 and index card 25 pass into the camera. Spacers, not shown, hold the legs of angles 31 apart and also clamp velure strips 28 at their ends. Cross screws, not shown, through angles 31 serve this purpose. Thus, the velure strips 28 yield in their central region when the index card is inserted between them and effect a light-tight seal with the card 25 and its supporting strip 23.

The entire seal asembly 27, being held on the camera body with screws 33 which pass through clearance holes 35, may be shifted around before the screws 33 are tightened to assure that an index card 23 and strip 25 are aligned with guide shoulders 22 in the holder 13 which supports the electroluminescent panel. Screws 33 are then tightened and a slotted external decorative plate 59 is applied with epoxy adhesive.

FIGURE 4 shows how the image to be recorded passes through camera lens 7 and is deflected by a mirror 47 in the direction of film 11. Mounted within the camera is a rotary solenoid 37 which operates a shutter 38. The shutter is controlled electrically to open prior to an exposure and to close at initiation of film transport following the taking of a photograph.

The circuitry and sequence of operations for controlling the electroluminescent panel 19 in connection with printing the data on film 11 will now be described in reference to FIGURE 2. Film 11 may be advanced in the camera frame-by-frame under automatic or manual control. There are two conductors 40, 41 supplied to the camera from the automatic exposure control, not shown. When the camera is inactive, that is, under normal conditions, line 40 is at twelve volts positive and line 41 is at ground. Lines 40, 41 connect to the camera control 42 through a manually operable reversing switch 43. When reversing switch 43 is depressed and its contacts transferred, the polarity on lines 44 running to camera control 42 is reversed but the camera control remains inactive at this time. However, operation of switch 43 causes positive voltage from line 40 be applied between point 45 and ground point 46. Two things then happen. Rotary solenoid coil 37 is energized, causing camera shutter 38 to open. At this time an X-ray exposure may be taken under manual control, for instance. With positive voltage at point 45, a capacitor 48 charges through the series circuit consisting of primary winding 49 of a pulse transformer, a series connected fixed resistor 40 and an adjustable resistor 51. The top plate of capacitor 48 is then positive. Concurrently with the conduction of a steep wave front pulse through primary 49 during charging of capacitor 48, a voltage is induced in secondary winding 52 of the transformer but no useful output voltage is produced therein because the secondary is short-circuited by a diode 43 which is forward biased when capacitor 48 is being charged.

Figure 2:
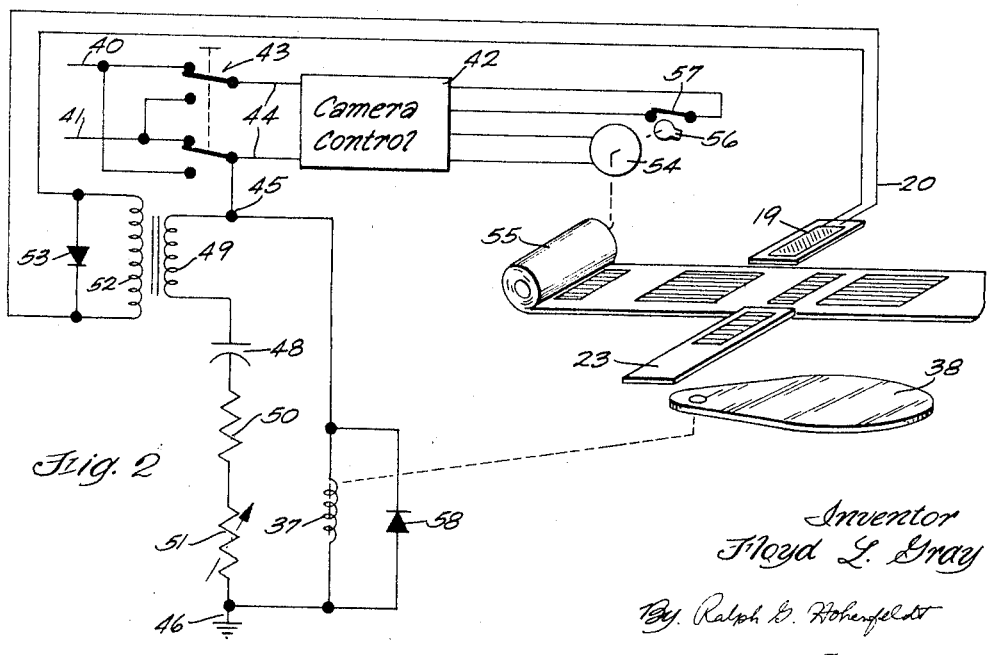
FIGURE 2 shows a circuit diagram for the fim identification device and relates the device to a film in a camera.

When switch 43 is released and restored to the position in which it is shown in FIGURE 2, point 45 becomes grounded again by reason of it being connected to line 41. This permits capacitor 48 to discharge rapidly to ground whereupon primary 49 induces a sharp voltage pulse in secondary 52. Diode 53 is now reverse-biased so that the voltage is applied to electroluminescent panel 19 to light it and cause printing of the data on film 11.

Release of switch 43 and restoration of the original polarity to camera control 42 causes film transport motor 43 to be energized and to drive film take-up reel 55 until one frame of film is advanced in the camera. Film advance is terminated when a cam 56 driven by motor 54 opens a switch 57. There are appropriate holding circuits, not shown, in camera control 42 for by-passing switch 57 when film transport is initiated.

Concurrently with restoration of manual switch 43 to the position in which it is shown, shutter solenoid 47 is deenergized and shutter 38 returns to closed position when film transport is initiated.

Even before shutter 38 begins closing, film transport motor 54 may have moved the film a short distance, but the light pulse from electroluminescent source 19 is so fast and bright that there is no smearing of the data on the film. In one actual embodiment, the discharge time of capacitor 48 is about 1.75 milliseconds with the voltage peaking in transformer secondary 52 at about 150 volts. Electroluminescent panel 19 may be rated at 115 volts AC. Setting of adjustable resistor 51 allows control of the time constant of the circuit including resistor 50 and capacitor 48. Usually, one setting is satisfactory for obtaining satisfactory film densities for many different types of films. Thus, resistor 51 only needs to be re-adjusted for marked differences in film speed, or to compensate for reduced brightness caused by aging of the electroluminescent panel. In one practical embodiment, capacitor 48 charges to twelve volts and has a capacity of ten microfarads. Resistor 50 has a value of fifteen ohms and variable resistor 51 is adjustable between zero and 150 ohms.

When the potential at point 45 is reversed by the automatic exposure control, not shown, instead of by transferring switch 43, the sequence of events is similar to that described above in connection with advancing the film manually by operation of switch 43. By switching voltage, the automatic exposure control opens the shutter 38 and, following a timed interval, an X-ray exposure is made. The image tube 4 is then blanked and the polarity of line 40 is again made positive and 41 is grounded to bring about shutter closing and film advance.

Data card 25 and card holder strip 23 may take forms other than the preferred embodiment described above. For instance, the card may be made translucent and rigid enough to eliminate the need for a card holder strip. The card holder may also be made in two layers with a space between for locating the data card in alignment with opening 24. Data card 25 may be made with an opaque background and transparent inscriptions as well as with opaque inscriptions and transparent background as described above. Any thin differentially light transmissive data bearing strip will serve the intended purposes. In any case, it is desirable that electroluminescent panel 19 be in close intimate contact with the data card and that the print on the data card be in intimate contact with the film so that when illuminated from the back, the data is cast on the film without the shadow image having any penumbra or observed unsharpness.

The means for supplying a synchronized electric energy pulse to the electroluminescent panel 19 may also take other forms. For instance, the electroluminescent panel may be energized by collapsing electromagnetic field from shutter solenoid 37, although additional measures have to be taken to provide for voltage control and limiting the peak voltage on the panel 19. In FIGURE 2, the transient voltage that is produced by de-energization of solenoid 37 is by-passed with a diode 58.

In summary, a new means for printing extra data directly on photographic films has been described. The means feature use of an electroluminescent panel that is built into the camera and in close contact with the data bearing card which is in turn in intimate contact with the film. The panel emits a short pulse of preferably green light to which the film is highly sensitive so that a short pulse of light may print the data without blurring even if the film is beginning its transport cycle. There is no light loss or diffusion, no filament heat to dissipate, no time lag for any filament to become bright or decay, and no lenses are required. The identification device can be installed in practically any camera.

Although a preferred embodiment of the invention has been described in considerable detail, such descrciption is intended to be illustrative rather than limiting, for the invention may be variously embodied and is to be limited only by construing the claims which follow.

I claim:

1. In combination with a camera, a device for printing extra data adjacent scenes that are recorded on film in the camera, comprising:
   (a) a camera housing,
   (b) a light-tight seal mounted in a side of the housing, said seal being adapted to admit to the interior of the housing a thin differentially light transmissive data bearing strip means,
   (c) an electroluminescent panel located inside the housing proximate to and in substantial parallelism with the film plane in the camera,
   (d) a source of electric energy connected to the panel and adapted to energize the panel periodically for short intervals, whereby to expose the data on a film when a strip has been inrtoduced through the seal between the panel and the film plane.

2. The invention set forth in claim 1 wherein said data bearing strip means comprises:
   (a) a substantially flat strip having a window surrounded by an opaque margin,
   (b) the margin providing a surface for applying an adhesive differentially light transmissive data card means over the window.

3. The invention set forth in claim 1 wherein:
   (a) said electric energy source includes a capacitor, a resistor and a transformer whose primary winding is in series with the capacitor and resistor,
   (b) an electric supply connectable alternately to charge and discharge the capacitor through said series circuit,
   (c) the secondary winding of said transformer being connected to the electroluminescent panel, and
   (d) a diode connected across the secondary winding, which diode is forward biased to shunt any current around the panel when the capacitor is charging,
   (e) discharge of said capacitor causing an electric pulse in said secondary winding which pulse energizes said electroluminescent panel momentarily to cause exposure of the extra data on a film.

4. A device for printing extra data on a film in a camera that is adapted to record a sequence of photographs of fluorescent images resulting from converted X-ray images:
   (a) said camera including a film pressure plate and a spring means urging said plate toward the film plane,
   (b) a holder having an open-ended recess and mounted on an edge of the pressure plate,
   (c) an electroluminescent panel mounted within the holder recess in substantial parallelism with the pressure plate, but spaced slightly from the film plane,
   (d) said camera having a slot in a wall thereof aligned with the end of the holder recess and a light-seal around the slot,
   (e) a data card holder strip having a window and which is dimensioned to be admitted to the interior of the camera through the light-sealed slot and into the space between the electroluminescent panel and the film plane,
(f) said data card holder strip being adapted to support a thin translucent data bearing card over the window, and
(g) a source of electric energy that is connected to the electroluminescent panel and is adapted to energize the panel at predetermined times to print the data on the film.

5. The invention set forth in claim 4 including:
(a) a data bearing flexible and translucent card means having pressure sensitive adhesive on one side for securing it to the card holder strip with the data over the window.

References Cited
UNITED STATES PATENTS 2,433,129  12/1947  Land _____ 250—65
2,630,534  3/1953  Heinecke et al. _____ 250—67

ARCHIE R. BORCHELT, *Primary Examiner.*

A. L. BIRCH, *Assistant Examiner.*

U.S. Cl. X.R.

95—1.1